United States Patent [19]

Herman

[11] Patent Number: 4,527,112
[45] Date of Patent: Jul. 2, 1985

[54] ENGINE SPEED CONTROL CIRCUIT FOR EMERGENCY VEHICLE

[76] Inventor: Charles A. Herman, 7518 Gathings Dr., Fort Wayne, Ind. 46816

[21] Appl. No.: 561,536

[22] Filed: Dec. 14, 1983

[51] Int. Cl.³ ............................................. H02J 7/32
[52] U.S. Cl. .................................. 320/61; 290/40 R; 290/50; 322/38
[58] Field of Search ............................ 320/12, 62, 61; 290/40 R, 40 B, 40 F, 50; 307/10; 322/38

[56] References Cited

U.S. PATENT DOCUMENTS

| | | | |
|---|---|---|---|
| 1,705,673 | 3/1929 | Menzies | 320/61 X |
| 3,192,394 | 6/1965 | Teter | 322/15 X |
| 3,719,881 | 3/1973 | Shibata et al. | 320/62 |
| 4,019,112 | 4/1977 | Satoh | 320/48 |
| 4,424,477 | 1/1984 | Enoshima et al. | 320/61 |

Primary Examiner—R. J. HicKey

Attorney, Agent, or Firm—Roger M. Rickert

[57] ABSTRACT

A control circuit for a vehicle electrical system which is operative when the vehicle engine is running but the vehicle is not in motion to sense vehicle storage battery voltage and, when that voltage is below a predetermined threshold, to enable an electrically controllable device to open somewhat the engine throttle raising engine speed and increasing the output of an engine driven electrical source. The control circuit finds particular utility in emergency vehicles such as ambulances and the like where that vehicle may remain at an emergency site for an extended period of time with the engine idling and with numerous electrical demands on the vehicle electrical system to increase the engine speed when those electrical demands have sufficiently exceeded the output of an engine driven alternator with the engine running at idle.

22 Claims, 1 Drawing Figure

ENGINE SPEED CONTROL CIRCUIT FOR EMERGENCY VEHICLE

SUMMARY OF THE INVENTION

The present invention relates generally to voltage level responsive control circuits and more particularly to such control circuits in a prime mover-voltage regulated electrical source-storage battery system where the control circuit monitors storage battery voltage and increases the speed of the prime mover in the event that the storage battery voltage becomes inadequate.

An illustrative environment and one in which the present invention finds particular utility is an emergency vehicle such as an emergency medical service vehicle ambulance, fire engine, police car and the like where the vehicle may remain parked at an emergency site for an extended period of time with the vehicle engine running and with numerous electrical devices operating off the electrical system of the vehicle. The electrical system may be called upon to supply all of the normal lighting requirements of the vehicle as well as emergency rotating beacons, flashing lights, two way radio communication and other electrical demands the aggregate of which will exceed the output of the vehicle engine driven alternator when the engine is running at idle.

Present day emergency medical service vehicles and ambulances are frequently built by purchasing a van or truck chassis from one of the major truck manufacturers and modifying that van or chassis to suit the particular needs as an emergency vehicle. Sometimes such modification will include the addition of a second alternator driven by the vehicle engine along with a second voltage regulator and storage battery to be charged by that alternator so that the system includes a parallel connected set of batteries as well as a parallel connected set of voltage regulated alternators. Even with this enhanced electrical capability the electrical demands on such an emergency vehicle at an emergency site frequently exceed the output of the alternators when the engine is idling.

Modern day vehicles of the type frequently modified for emergency medical service are designed to meed certain standards imposed by federal regulations on the exhaust emissions of certain pollutants such as carbon monoxide, sulfur dioxide and oxides of nitrogen. One system for helping to meet these federal standards is the provision of a vacuum actuable piston and an electrically controllable valve arrangement for selectively activating that piston to hold the engine throttle control somewhat more open than its normal idle position at times when the vehicle is decelerating at engine speeds above some specified level rather than allowing the throttle valve to completely close at these times. The structure of this antipollution arrangement may take many forms but its essence is to hold the engine throttle at a more open position than that dictated by the accelerator pedal during certain portions of vehicle deceleration. As supplied by the manufacturer this antipollution device is not active when the vehicle is parked with the engine idling.

Among the several objects of the present invention may be noted the utilization of the above described antipollution arrangement for an entirely different purpose at times when it is not performing its original intended purpose; the provision of a vehicle electrical system control circuit for enhancing the output of a voltage regulated electrical source such as one or more alternators when the electrical system requires such an enhanced output; the provision of a scheme for increasing vehicle engine speed while that vehicle is parked in an engine idle condition upon either an automatic indication that such increased speed is desired or at the will of the vehicle driver or operator; and the provision of an emergency vehicle electrical system of enhanced versatility. These as well as other objects and advantageous features of the present invention will be in part apparent and in part pointed out hereinafter.

In general a control circuit for a vehicle includes an arrangement for maintaining a vehicle engine throttle control at an engine speed setting above normal idle at prescribed times with an arrangement for monitoring the vehicle storage battery voltage and, in response to that monitored voltage being below a predetermined threshold, increasing the throttle control engine speed setting thereby driving an engine driven electrical source at a higher speed and a correspondingly higher output to meet the electrical demands associated with vehicle operation. The system may also be placed in the increased engine speed mode by manual actuation regardless of battery voltage and taken out of that increased engine speed mode by operator actuation of a control specifically dedicated to that purpose as well as operator actuation of several conventional vehicle controls the use of which would dictate that the engine should not be running in an increased speed mode such as actuation of the vehicle brake pedal or shifting the vehicle transmission control lever from a neutral condition such as "park" into a drive position.

BRIEF DESCRIPTION OF THE DRAWING

The single drawing FIGURE illustrates a portion of a vehicle electrical system along with a portion of a vacuum actuated vehicle pollution control system with the control circuit of the present invention incorporated therein.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
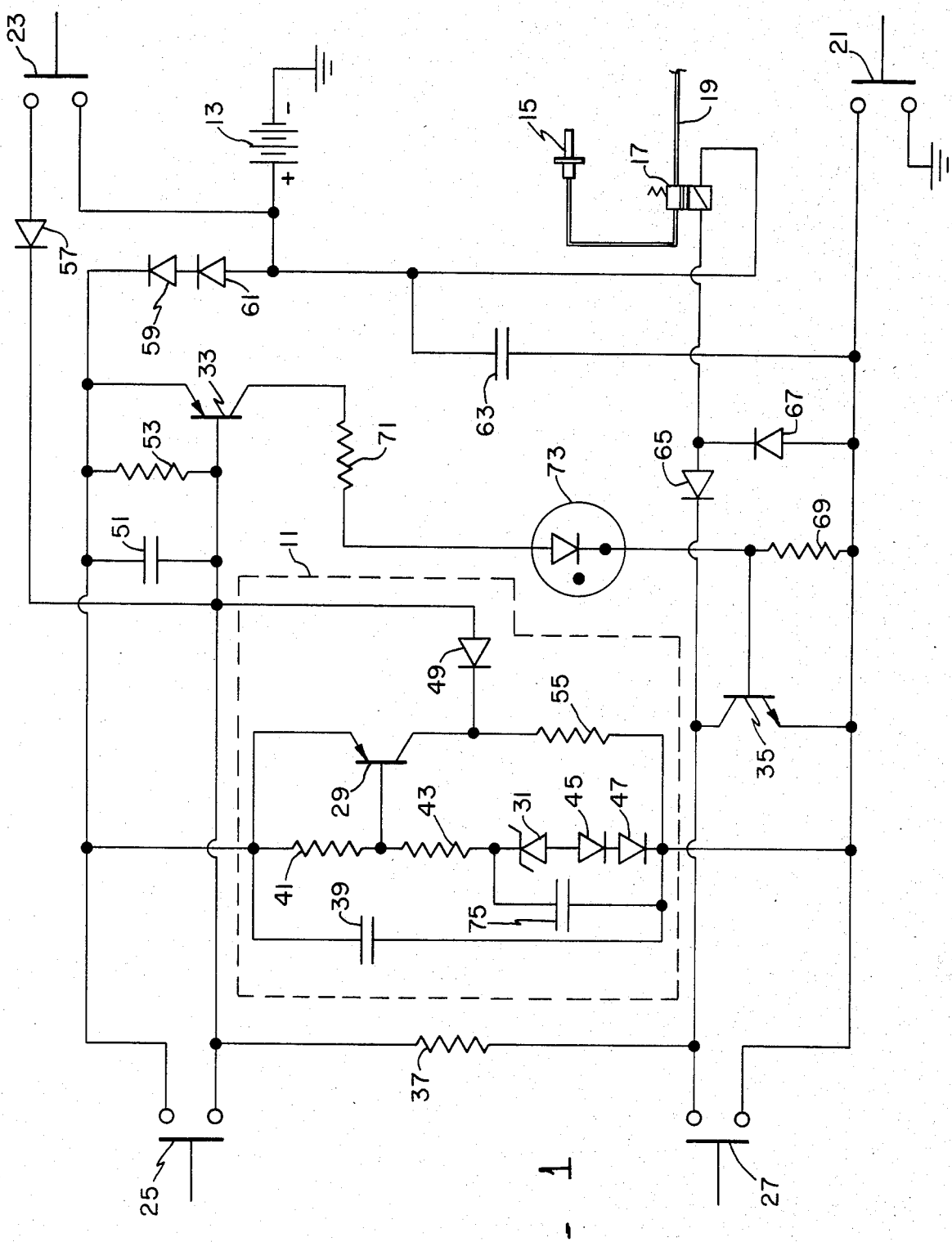

Referring now more specifically to the drawing a somewhat conventional vehicle in which the present invention is to be incorporated may include a storage battery 13, perhaps physically configured as a pair of conventional vehicle storage batteries connected in parallel, along with one or more engine driven voltage regulated electrical sources typically alternators for charging the storage battery 13 and for supplying the electrical needs of the vehicle system. The vehicle prior to incorporation of the present inventive circuitry may also include a vacuum actuable piston arrangement 15 under the control of an electrically controlled valve 17 so that, when valve 17 is electrically energized, an engine vacuum source such as the intake manifold or base region of the carburetor is connected by way of line 19 to the mechanical device 15 to block or move a carburetor throttle control linkage so as to cause the throttle to be more wide open than at engine idle. As noted earlier this electrically controllable mechanical device for holding an engine throttle control somewhat more open than its normal idle position is currently employed on some vehicles during deceleration at engine speeds above some specified value for pollution control purposes. The present invention employs this electrically controllable mechanical device 15 and 17 for other than pollution control purposes. A switch 21 which is closed when the vehicle shift lever is in neutral or equivalently a park position (a term "neutral" encompasses both) and a vehicle brake light actuating switch 23 which is closed when the operator of the vehicle applies its brakes are the only other conventional vehicle elements in the schematic diagram. Thus elements 13, 15, 17, 19, 21 and 23 may be present on a vehicle prior to incorporation of the present invention.

The remaining circuitry of FIG. 1 may be physically encapsulated in an epoxy or similar material for moisture and mechanical protection purposes with a light emitting diode 73 and a pair of normally open manually actuable switches 25 and 27 accessible to the vehicle driver or operator so that he may visually determine the status of the system and, under the proper circumstances, change that status by depressing one of the buttons 25 or 27 momentarily. If only such manual control of the system is desired the storage battery voltage monitoring circuitry enclosed within the dotted line 11 may be omitted.

The circuit 11 for monitoring the voltage of storage battery 13 senses that voltage by the series connection of a zener diode 31, a pair of diodes 45 and 47 which provide a small but well defined voltage drop of around 0.5 to 0.7 volts each, and the pair of resistors 41 and 43 with this entire series circuit being essentially connected between the positive terminal of battery 13 and ground when switch 21 is closed indicating the vehicle transmission selector level is in a neutral or park position. So long as the battery voltage is above some predetermined level such as 12 volts the zener diode 31 is reverse biased and conducting and the corresponding voltage drop across resistor 41 is sufficient to forward bias the base-emitter circuit of transistor 29 causing transistor 29 to also be in a conducting state. Capacitor 39 is connected in parallel with this series voltage sensing circuit merely as a filter to prevent transient phenomenon associated with vehicle operation from providing a false battery voltage level indication. In some applications capacitor 75 may be added for a similar purpose. When the voltage of battery 13 drops below a predetermined level and the reverse bias voltage on zener diode 31 becomes insufficient to maintain that diode conducting and current flow through resistor 41 ceases causing transistor 29 to switch into its nonconducting state. So long as transistor 29 was conductive that transistor effectively short circuited resistor 53 precluding the application of any base drive to transistor 33.

However, when transistor 29 becomes nonconductive base drive current is supplied to transistor 33 and that transistor now conducts and by way of resistor 71 and light emitting diode 73 (now lit to indicate enhanced engine speed) creates a voltage drop across resistor 69 forward biasing transistor 35 to also become conducting. Conduction by transistor 35 completes the circuit from the positive terminal of battery 13 through the electrically controlled valve 17 and by way of closed switch 21 to ground enabling valve 17 to apply the vacuum from line 19 to the piston arrangement 21 increasing engine speed as desired. Once the transistors 33 and 35 become conductive the engine speed increases as does alternator output, the battery voltage will likely increase to above the threshold determined by zener diode 31. However, it would not be desirable for the voltage sensing circuit to now indicate that engine speed should be reduced. This circuit is arranged to have a latching function so that even though the battery voltage does increase at enhanced engine speeds no reversal of the process slowing the engine speed occurs unless the operator should intervene. This latching function occurs because once transistor 35 becomes conductive, resistor 37 provides forward bias on transistor 33. Numerous other actions or occurrences will, however, take the circuit out of this latched condition disabling the control valve 17 and allowing the engine to return to idle.

The vehicle transmission selector lever might inadvertently be bumped from its neutral or park position opening the switch 21 removing the ground connection and immediately disabling the valve 17 as well as causing the several transistors to go into their nonconducting state. Preparatory to moving the vehicle the driver might depress the brake pedal energizing the vehicle brake lights by way of switch 23. Closure of switch 23 connects the positive terminal of battery 13 by way of diode 57 to the base of transistor 33 reversed biasing (due to the slight voltage drop across diodes 59 and 61) the base-emitter circuit of transistor 33 causing that transistor to become nonconductive extinguishing the indicator 73 and removing base drive current from transistor 35 also switching that transistor to a nonconducting state and disabling control valve 17. The driver or operator may wish to manually reduce engine speed to idle and this is accomplished by simply momentarily closing the switch 25 shunting the base-emitter circuit of transistor 33 again causing that transistor to become nonconductive.

Regardless of whether the battery voltage sensing circuit 11 is present or not the vehicle operator may momentarily depress switch 27 inducing base-emitter current flow in transistor 33 from the positive battery terminal by way of resistor 37 and the closed contacts of switch 27 to ground causing transistor 33 to again become conductive inducing the previously described sequence of events ultimately resulting in energization of the control valve 17 and enhanced engine speed.

The circuit of the schematic diagram has been successfully incorporated into vans supplied by the Ford Motor Company and General Motors having the emission control throttle opening plunger 15 and electrically controlled valve 17 as a part of the standard equipment and with such a van being modified to include a pair of parallel connected storage batteries schematically illustrated at 13 along with a pair of alternators each having its own voltage regulator. On such an installation the following is a complete list of the circuit components with values and an occasional brief comment about that component elaborating on the above discussion:

| REFERENCE NO. | DESCRIPTION | COMMENT |
| --- | --- | --- |
| 55 | 1200 OHM Resistor | Current limiter and base current for 33 |
| 53 | 560 OHM Resistor | Reverse bias for 33 |
| 41 & 43 | 1200 OHM ¼ Watt Resistor | Voltage divider and bias |
| 39 | 150 Microfarad Capacitor | Filter |
| 29 | 2N 4126 PNP Transistor | |
| 31 | Zener Diode 9.3 volt | |
| 45, 47, 59 | 1N 4001 Diode | Drop Each 0.5–0.7 Volt |

-continued

| REFERENCE NO. | DESCRIPTION | COMMENT |
| --- | --- | --- |
| 57, 61, 67 | 1N 4001 Diode | |
| 25 & 27 | Normally open, momentary close push button switch | |
| 73 | red light emitting diode | |
| 65 | 1N 4001 Diode | |
| 63 | 0.1 Microfarad Capacitor | Filter |
| 51 | 39 Microfarad Capacitor | Filter |
| 71 | 270 OHM Resistor | Current Limiter |
| 37 | 1200 OHM Resistor | Bias |
| 69 | 560 OHM Resistor | Bias |
| 35 | 2N 5190 NPN Transistor | |
| 33 | 2N 4126 PNP Transistor | |
| 75 | 39 Microfarad Capacitor | Filter |

From the foregoing it is now apparent that a novel control arrangement for an emergency vehicle providing enhanced engine speed and electrical generator output upon operator demand or upon system need has been disclosed meeting the objects and advantageous features set out herein before as well as others and that modifications as to the precise configuration, shapes and details may be made by those having ordinary skill in the art without departing from the spirit of the invention or the scope thereof as set out by the claims which follow.

What is claimed is:

1. A control circuit for a vehicle electrical system of the type where the vehicle engine functions as a prime mover of a voltage regulated electrical source with that source in turn supplying current to meet the electrical requirements of the vehicle including vehicle storage battery charging current comprising;

means for selectively maintaining a vehicle engine throttle at an engine speed setting above normal engine idle;

means for monitoring vehicle storage battery voltage;

means responsive to an indication by the monitoring means that battery voltage is less than a predetermined threshold for enabling the means for selectively maintaining thereby driving the electrical source at a higher speed and correspondingly higher output than the speed and output corresponding to engine idle, including latching circuitry whereby once enabled the engine speed remains above normal idle even though battery voltage rises above the predetermined threshold; and means responsive to vehicle driver intervention for disabling the latching circuitry to allow engine speed to return to normal idle comprising a switch actuated by movement of a vehicle transmission control lever for disabling the latching circuitry when the vehicle transmission is in other than a neutral state.

2. The control circuit of claim 1 wherein the means responsive to driver intervention additionally comprises a normally open manually actuable switch which may be momentarily closed by the driver to disable the latching circuitry.

3. The control circuit of claim 1 further comprising a normally open manually actuable switch which may be momentarily closed by a vehicle operator to cause the responsive means to enable the means for selectively maintaining regardless of any indication by the monitoring means.

4. The control circuit of claim 1 wherein the means for selectively maintaining comprises a vacuum actuable piston which when actuated moves into a position holding the engine throttle part way open.

5. The control circuit of claim 4 further comprising an electrically actuable vacuum control valve which when enabled connects an engine vacuum line to the vacuum actuable piston.

6. The control circuit of claim 5 wherein both the vacuum actuable piston and vacuum control valve are dual purpose devices being further employed for conventional engine emission reduction by holding the throttle slightly open during vehicle deceleration at engine speeds above a specified value.

7. The control circuit of claim 1 wherein the means for monitoring storage battery voltage includes a voltage sensing circuit including a zener diode and a control circuit including a transistor.

8. The control circuit of claim 7 wherein the transistor is in a conductive state and the zener diode is reverse biased and conducting so long as the battery voltage exceeds the predetermined threshold.

9. In an engine powered vehicle of the type having a storage battery, an engine driven voltage regulated electrical source for charging the storage battery and supplying the other electrical needs of the vehicle system and an engine emission reduction system including an electrically controllable mechanical device for holding an engine throttle control somewhat more open than its normal idle position during vehicle deceleration at engine speeds above a specified speed, the improvement comprising a control circuit operative when the vehicle engine is running but the vehicle is not in motion to sense battery voltage and when that voltage is below a predetermined threshold to enable the electrically controllable device to open somewhat the engine throttle raising engine speed and increasing the output of the engine driven electrical source, the control circuit including means for monitoring vehicle storage battery voltage, means responsive to an indication by the monitoring means that battery voltage is less than the predetermined threshold for providing an output to enable the electrically controllable mechanical device including latching circuitry whereby once enabled the engine speed remains above normal idle even though battery voltage rises above the predetermined threshold, and first, second and third means responsive to vehicle driver intervention for disabling the latching circuitry to allow engine speed to return to normal idle, the first means comprising a switch actuated by movement of a vehicle transmission control lever for disabling the latching circuitry when the vehicle transmission is in other than a neutral state, the second means comprising the vehicle brake light actuating switch connected to disable the latching circuitry when the brake lights are energized, the third means comprising a normally open manually actuable switch which may be momentarily closed by the driver to disable the latching circuitry, a normally open manually actuable switch which may be momentarily closed by a vehicle operator to cause the responsive means to provide an output to enable the electrically controllable mechanical device regardless of any indication by the monitoring means, the means for monitoring vehicle storage battery voltage including a voltage sensing circuit having a zener diode and a control circuit having a transistor with the transistor being in a conductive state and the zener diode being reversed biased and conducting so long as the battery voltage exceeds the predetermined threshold, and responsive means comprising first and second transistors coupled together so that the conductive state of the second transistor is directly controlled by the conductive state of the first transistor with the means for monitoring maintaining the base and emitter of the first transistor at substantially the same potential thereby denying that transistor any base drive current and maintaining that transistor in a nonconconductive state so long as battery voltage is above the predetermined threshold, the third means for disabling comprising an "off" button which upon actuation connects the base and emitter of the first transistor rendering that transistor nonconductive and depriving the second transistor of any base drive current to also render the second transistor nonconductive.

10. A control circuit for a vehicle electrical system of the type where the vehicle engine functions as a prime mover of a voltage regulated electrical source with that source in turn supplying current to meet the electrical requirements of the vehicle including vehicle storage battery charging current comprising;
means for selectively maintaining a vehicle engine throttle at an engine speed setting above normal engine idle;
means for monitoring vehicle storage battery voltage;
means responsive to an indication by the monitoring means that battery voltage is less than a predetermined threshold for enabling the means for selectively maintaining thereby driving the electrical source at a higher speed and correspondingly higher output than the speed and output corresponding to engine idle, including latching circuitry whereby once enabled the engine speed remains above normal idle even through battery voltage rises above the predetermined threshold; and
means responsive to vehicle driver intervention for disabling the latching circuitry to allow engine speed to return to normal idle comprising a vehicle brake light actuating switch connected to disable the latching circuitry when the brake lights are energized.

11. The control circuit of claim 10 wherein the means responsive to driver intervention additionally comprises a normally open manually actuable switch which may be momentarily closed by the driver to disable the latching circuitry.

12. The control circuit of claim 10 further comprising a normally open manually actuable switch which may be momentarily closed by a vehicle operator to cause the responsive means to enable the means for selectively maintaining regardless of any indication by the monitoring means.

13. The control circuit of claim 10 wherein the means for selectively maintaining comprises a vacuum actuable piston which when actuated moves into a position holding the engine throttle part way open.

14. The control circuit of claim 13 further comprising an electrically actuable vacuum control valve which when enabled connects an engine vacuum line to the vacuum actuable piston.

15. The control circuit of claim 14 wherein both the vacuum actuable piston and vacuum control valve are dual purpose devices being further employed for conventional engine emission reduction by holding the throttle slightly open during vehicle deceleration at engine speeds above a specified value.

16. The control circuit of claim 10 wherein the means for monitoring storage battery voltage includes a voltage sensing circuit including a zener diode and a control circuit including a transistor.

17. The control circuit of claim 16 wherein the transistor is in a conductive state and the zener diode is reverse biased and conducting so long as the battery voltage exceeds the predetermined threshold.

18. A control circuit for a vehicle electrical system of the type where the vehicle engine functions as a prime mover of a voltage regulated electrical source with that source in turn supplying current to meet the electrical requirements of the vehicle including vehicle storage battery charging current comprising;
means for selectively maintaining a vehicle engine throttle at an engine speed setting above normal engine idle;
means for monitoring vehicle storage battery voltage;
means responsive to an indication by the monitoring means that battery voltage is less than a predetermined threshold for enabling the means for selectively maintaining thereby driving the electrical source at a higher speed and correspondingly higher output than the speed and output corresponding to engine idle, including first and second transistors coupled together so that the conductive state of the second is directly controlled by the conductive state of the first, the means for monitoring maintaining the base and emitter of the first transistor at substantially the same potential thereby denying the first transistor any base drive current and maintaining that transistor in a nonconductive state so long as battery voltage is above the predetermined threshold, the first and second transistors each being provided with a bias resistor coupled between base and emitter for ensuring that the respective transistor remains nonconducting until switched into a conducting state;
a light emitting diode in circuit between the first and second transistors illuminated by current flow therebetween indicating that the engine is being held at a speed higher than normal idle; and
an operator actuable "off" button which upon actuation connects the base and emitter of the first transistor rendering that transistor nonconductive and depriving the second transistor of any base drive current to also render the second transistor nonconductive.

19. A control circuit for a vehicle electrical system of the type where the vehicle engine functions as a prime mover of a voltage regulated electrical source with that source in turn supplying current to meet the electrical requirements of the vehicle including vehicle storage battery charging current comprising;
means for selectively maintaining a vehicle engine throttle at an engine speed setting above normal engine idle;
solid state control circuitry for enabling the means for selectively maintaining thereby driving the electrical source at a higher speed and correspondingly higher output than the speed and output corresponding to engine idle; and
means responsive to vehicle driver intervention for disabling the solid state control circuitry returning engine speed to normal idle comprising a vehicle brake light actuating switch connected to disable the solid state control circuitry when the brake lights are energized, and a switch actuated by movement of a vehicle transmission control lever for disabling the solid state control circuitry when the vehicle transmission is in other than a neutral state.

20. The control circuit of claim 19 wherein the means for selectively maintaining comprises a vacuum actuable piston which when actuated moves into a position holding the engine throttle part way open.

21. The control circuit of claim 20 further comprising an electrically actuable vacuum control valve which when enabled connects an engine vacuum line to the vacuum actuable piston.

22. The control circuit of claim 21 wherein both the vacuum actuable piston and vacuum control valve are dual purpose devices being further employed for conventional engine emission reduction by holding the throttle slightly open during vehicle deceleration at engine speeds above a specified value.

* * * * *